Nov. 22, 1932.　　C. H. KROYER ET AL　　1,888,925
LAND LEVELING DEVICE
Filed Sept. 11, 1931　　2 Sheets-Sheet 1

INVENTORS
C. H. KROYER
R. A. FARISH
BY Victor J. Evans & Co.
ATTORNEYS.

Patented Nov. 22, 1932

1,888,925

UNITED STATES PATENT OFFICE

CLIFTON H. KROYER AND ROBERT A. FARISH, OF SAN FRANCISCO, CALIFORNIA, ASSIGNORS TO AMERICAN TRACTOR EQUIPMENT CO., OF OAKLAND, CALIFORNIA, A CORPORATION OF NEVADA

LAND LEVELING DEVICE

Application filed September 11, 1931. Serial No. 562,342.

This invention relates to improvements in land leveling devices and has particular reference to that type of device commonly known as a bulldozer.

The principal object of this invention is to produce a device wherein the scraper element may be raised and lowered from the driver's seat upon the vehicle to which the device is attached.

A further object is to produce a device wherein the elevating mechanism causes an even lift on both sides of the scraper.

A further object is to produce a device wherein the working parts are completely encased, thereby eliminating wear incident to work of this nature.

A still further object is to produce a device which may be attached to any standard form of tractor and particularly that type having endless tracks.

Other objects and advantages will be apparent during the course of the following description.

Figure 1:
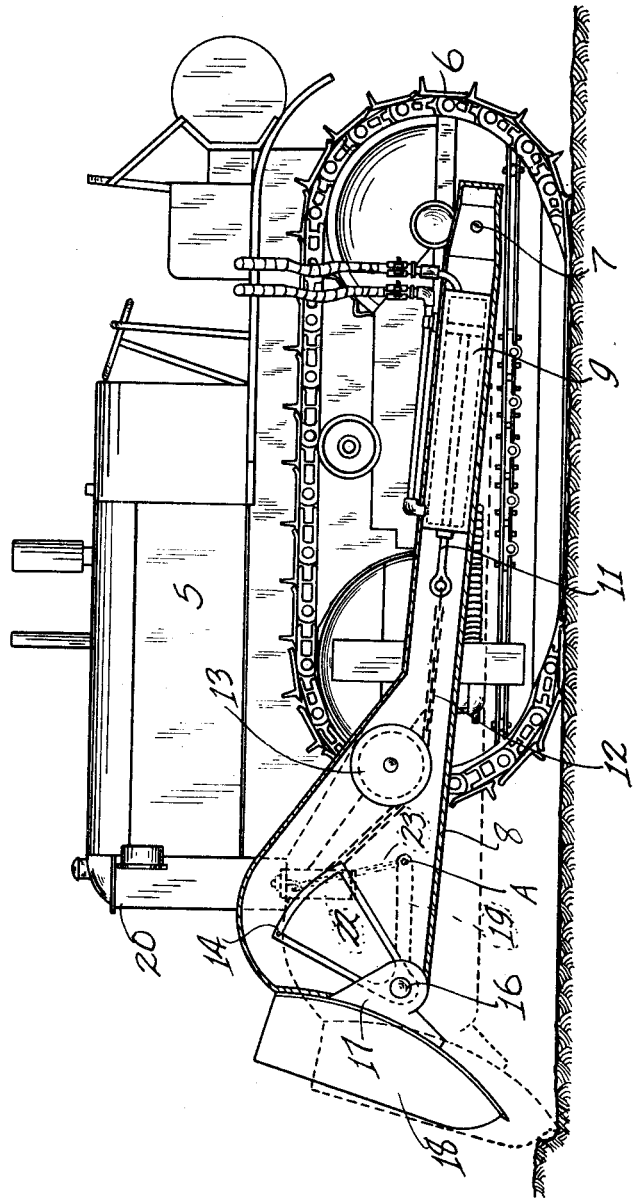
Figure 2:
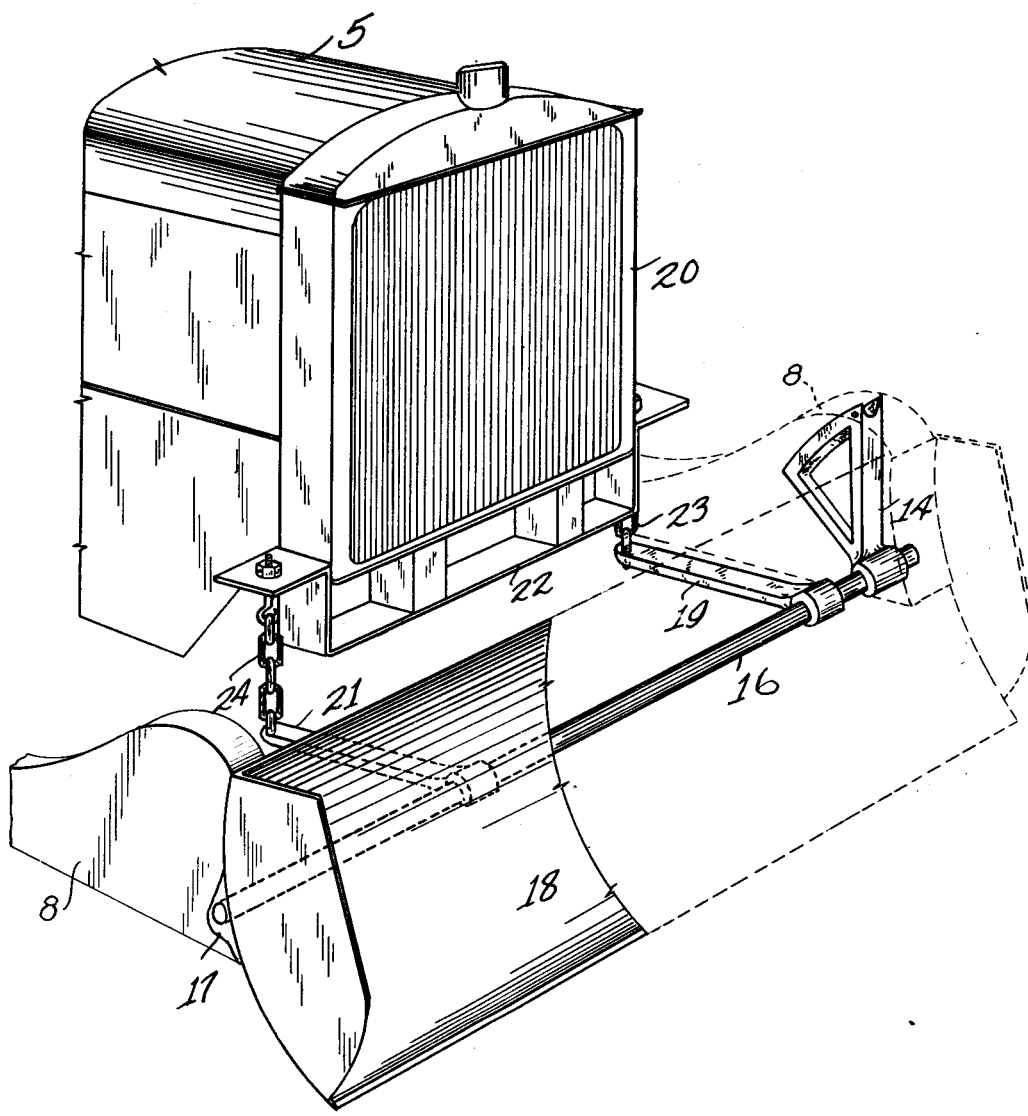

In the accompanying drawings forming a part of this specification and in which like numerals are employed to designate like parts throughout the same, Fig. 1 is a side elevation of a tractor having our device attached thereto and showing certain parts in cross section, and Fig. 2 is a fragmentary perspective view illustrating the principle involved.

In leveling land it is common to employ a tractor having a scraper attached to the forward end thereof, which scraper is dropped into engagement with the ground and as the tractor proceeds, this scraper pushes the dirt ahead of the tractor and deposits it at a given spot. A scraper of this character places a very heavy strain upon the tractor unless it is properly balanced and properly supported from the tractor. It often occurs that a scraper will dig in the ground when the tractor is descending from a slight rise and this digging in may be sufficient to stall the tractor. With applicants' device the connection between the tractor and the scraper is such that the tractor may tip without forcing the scraper into the ground.

In the accompanying drawings wherein for the purpose of illustration is shown a preferred embodiment of our invention, the numeral 5 designates a tractor as a whole having the customary ground engaging elements which may be wheeled over self-laying tracks as shown at 6 in the present instance. We pivotally attach as at 7 to any suitable portion of the tractor and upon opposite sides thereof pusher arms 8. The arm as shown in Figure 1 is of hollow construction and serves to support therein a hydraulic cylinder 9. It is to be understood that this hydraulic cylinder is merely illustrative of the principle involved and that other power means might be employed such as gearing, a screw or the like or any suitable arrangement which would actuate a draw-bar 11. This draw-bar is connected to a chain 12, which chain passes under a sheave 13 and has its free end connected to a segment frame 14. This frame is secured to a shaft 16 which shaft is journalled as at 17 to the rear of the scraper 18. This same shaft serves to journal the scraper to the pusher arms. Arms 19 and 21 are secured to the shaft 16 and extend rearwardly to a point substantially beneath the radiator 20 of the tractor. Beneath this radiator and supported from any suitable portion of the vehicle is a yoke 22 which serves to support chains 23 and 24, the lower ends of which are connected to the arms 19 and 21 respectively. It is to be understood that the pusher arms may be similar, but the one attached to the opposite side of the machine, to that shown in Figure 1, contains no mechanism and may, if desired, be simply an I-beam construction.

The operation of our device is as follows:—

Assuming that the device has been attached to a tractor, the operator thereof actuates the valves of the tractor in such a manner that fluid may be admitted to one end of the cylinder 9 and if the scraper is in elevated position shown in Figure 1, the control would be such that the rod 11 will move toward the left of the drawing and as a result the chain 12 passing beneath the sheave 13 will permit the segmental frame 14 to move toward the left of the drawing which will rotate the shaft 16 in a counter-clockwise direction, thus tending to elevate the point A, but as the weight of the entire mechanism is upon the point A the result would be that this point will become the fulcrum point and the shaft 16 and all of the attached parts will start moving downwardly until the scraper comes into contact with the ground. When the operator causes the fluid to flow in the opposite end of the cylinder 9 the drawing in of the rod 11 will pull upon the chain 12, segmental frame 14, rotating shaft 16 placing pressure upon the point A through the arms 19 and 21 and will thus lift the scraper and support the same. It is to be here noted that if the scraper is in contact with the ground and the tractor should tip forwardly so that the radiator 20 moves toward the ground it will be apparent that the chains 23 and 24 being flexible will not transmit this tipping motion of the tractor to the scraper and therefore the scraper when travelling with a load will practically float irrespective of the rocking movement of the tractor.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:—

1. A scraper mechanism adapted to be attached to a tractor, and comprising a scraper, a pair of pusher arms secured to said scraper and to said tractor, a shaft journaled on said scraper, means extending rearwardly from the shaft and connecting the latter to said tractor, means for rotating said shaft and including a member secured to said shaft and power means for rotating said member about the axis of said shaft.

2. A scraper mechanism adapted to be attached to a tractor and comprising a scraper, a pair of pusher arms secured to said scraper and to said tractor, a shaft journalled on said scraper, a pair of arms extending rearwardly from said shaft, the free ends of said arms being attached to said tractor, means for rotating said shaft, said means including a segmental member secured to said shaft, a chain secured to said segmental member, said chain extending to a remote point with relation to said segmental member, and power actuating means for re-tracting said chain so as to cause said segmental member to rotate about the axis of said shaft.

3. In a device of the character described adapted to be attached to a tractor, a scraper, a pair of pusher arms secured to said scraper and to said tractor, one of said arms being hollow, a shaft journalled to said scraper, a pair of arms extending rearwardly from said shaft and having their free ends supported from said tractor, a segmental member secured to said shaft at a point within said hollow pusher arm, a sheave positioned in said pusher arm, flexible means secured to said segmental member and reaved over said sheave, and a power actuated draw-bar connected to said flexible member.

In testimony whereof we affix our signatures.

CLIFTON H. KROYER.
ROBERT A. FARISH.